US008578785B2

(12) United States Patent
Borenstain et al.

(10) Patent No.: US 8,578,785 B2
(45) Date of Patent: Nov. 12, 2013

(54) DRIP MONITOR

(75) Inventors: Robert Borenstain, Cfar Shmuel (IL); Itzhak Pomerantz, Kfar Saba (IL)

(73) Assignee: Afeka Tel Aviv Academic College of Engineering, Tel Aviv (IL)

( * ) Notice: Subject to any disclaimer, the term of this patent is extended or adjusted under 35 U.S.C. 154(b) by 175 days.

(21) Appl. No.: 13/323,970

(22) Filed: Dec. 13, 2011

(65) Prior Publication Data
US 2012/0152032 A1 Jun. 21, 2012

Related U.S. Application Data

(60) Provisional application No. 61/423,606, filed on Dec. 16, 2010.

(51) Int. Cl.
*G01F 1/00* (2006.01)
(52) U.S. Cl.
USPC .......................................... 73/861
(58) Field of Classification Search
USPC .............................. 73/861, 258; 210/670, 185
See application file for complete search history.

(56) References Cited

U.S. PATENT DOCUMENTS

| 4,432,761 | A |  | 2/1984 | Dawe |
| 4,504,263 | A |  | 3/1985 | Steuer et al. |
| 4,509,943 | A |  | 4/1985 | Hanzawa |
| 5,261,275 | A | * | 11/1993 | Davis .............................. 73/258 |
| 6,398,930 | B2 | * | 6/2002 | Fukunaga et al. ............. 204/409 |
| 6,853,309 | B1 | * | 2/2005 | Schroter .................. 340/870.02 |
| 7,190,275 | B2 |  | 3/2007 | Goldberg et al. |
| 2007/0151905 | A1 | * | 7/2007 | Wang et al. ...................... 210/97 |
| 2007/0295665 | A1 | * | 12/2007 | Ayala et al. .................... 210/670 |
| 2008/0150750 | A1 | * | 6/2008 | Parris et al. .............. 340/870.02 |

* cited by examiner

Primary Examiner — Jewel V Thompson
(74) Attorney, Agent, or Firm — Law Office of Joseph L. Felber

(57) ABSTRACT

A low power, low cost system and method for the detection of flow disturbances in a fluid dripping system is disclosed. In one embodiment, a light source and a light detector configured to monitor the amount of light passing through a droplet while the droplet is suspended and later falls from the tip of a tube. In another embodiment, dripping fluid is monitored from a system maintained part of the time in a sleep mode to conserve power, the system waking up at predetermined times to determine from detected light whether the monitored system is functioning properly.

3 Claims, 5 Drawing Sheets

Figure 1 – Prior Art

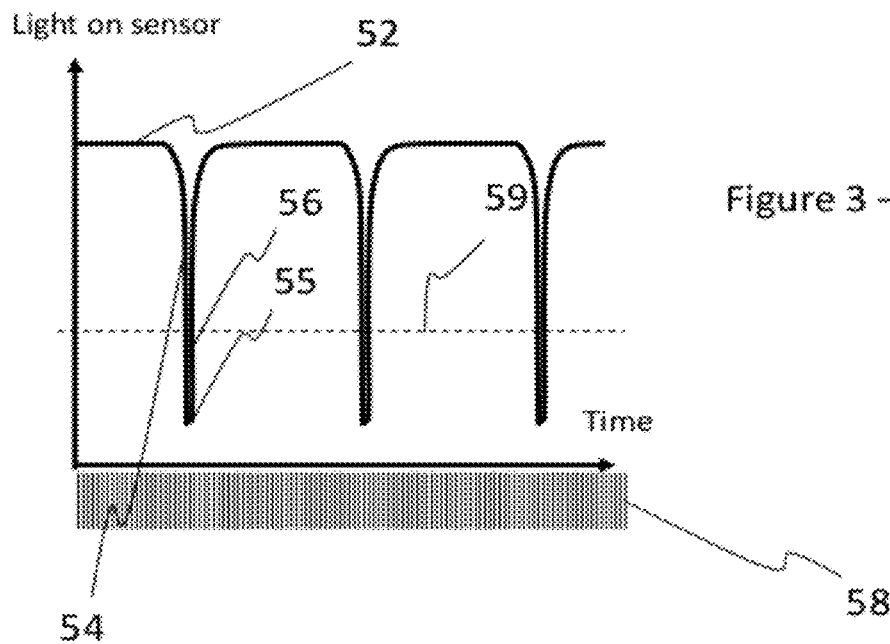
Figure 3 – Prior Art
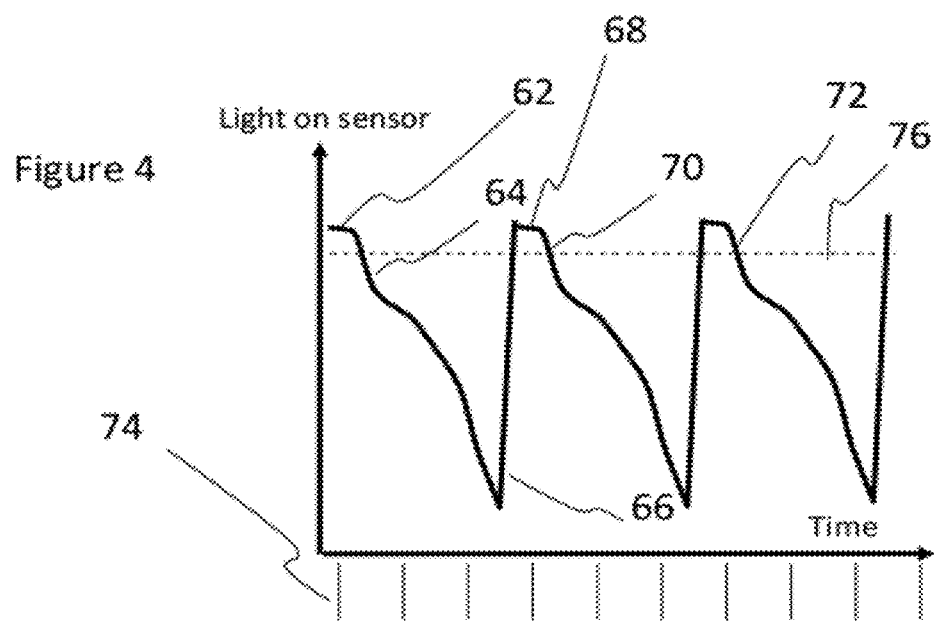
Figure 4

DRIP MONITOR

This application claims priority under 35 U.S.C. §119(e) to U.S. Provisional Application No. 61/423,606, filed Dec. 16, 2010, which is hereby incorporated by reference in its entirety.

BACKGROUND

Systems that deliver a controlled flow of liquid are well known in the art—such as IntraVessel Infusion poles and kits. The rate of infusion is typically monitored by the naked eye as the liquid passes through a transparent control compartment where the liquid drips in visible droplets. As the size of the droplet is relatively fixed and determined by the chemical properties of the liquid, the rate of droplets is a good estimate of the flow and can be easily monitored by the care giver's eye.

However, monitoring the rate of the droplets requires continuous attention by a human operator or by the patient.

Several solutions have been suggested to automate the monitoring of the droplet rate. Some solutions involve a controlled electric pump (such as the "Sabratek 3030 IV Infusion Pump" made by Baxter from Chicago, Il) that is very accurate. However, it is costly and too cumbersome for field emergency treatment. Furthermore, it is out of the scope of the present invention.

Some solutions have also been suggested as an add-on on conventional IV infusion sets, such as IVIC by HanvitMD from Korea. It is a special watch that enables an operator to precisely set the drop rate. This product does is not attached to the IV system and does not free the operator from having to attend to it.

Another solution is described in U.S. Pat. No. 4,504,263 to Steuer et al., where the line of sight between a light source and a light sensor is blocked by the droplets and the rate of droplets falling can be determined from the electric signal of the sensor. This solution is good only for vertical orientation of the device and consumes significant electric power, because the circuitry must be active at all times.

Other solutions, such as described in U.S. Pat. No. 7,190,275 to Goldberg et al., U.S. Pat. No. 4,509,943 to Hanzawa, U.S. Pat. No. 4,432,761 to Dawe, and in other publications teach a light beam crossing mechanism where the falling droplet crosses the line of sight between a light source and a light sensor. They too suffer from similar problems: they consume electricity continuously and they are sensitive to the vertical orientation of the control compartment.

Thus, it would be very desirable to have a drip monitoring system that is not sensitive to the vertical orientation of the control compartment and that does not consume power very frequently.

It is the purpose of the present invention to provide such a solution,

SUMMARY

Embodiments of the invention will be explained using the terms "sleeve of sight," which is an extension of the concept of "line of sight" to a cylinder having a finite diameter around the line of sight. The amount of light received by the sensor is a continuous, not a binary value, and it depends on the percentage of the cross section of the sleeve of sight that is blocked.

The invention may be embodied as a system for detecting discontinuities in the flow of fluid dripping from a tube. The system has a light source and a light detector configured to monitor the amount of light passing through a droplet while the droplet is suspended on the tip of said tube.

The invention may also be embodied as a method of monitoring the dripping of fluid from a tube. The method includes: (a) keeping a monitoring system in a low power sleep mode for a predetermined amount of time; (b) waking the system up from the low power sleep mode to a normal mode and measuring the amount of light detected by a light sensor; and (c) selecting between sending the system back to sleep and creating an alert, based upon the amount of light detected by said light sensor.

The invention may further be embodied as a method of discriminating, in a control device monitoring a flow path of a fluid, between two problem states, where one of the states is an up-stream lack of fluid supply and the other state is a down-stream blocking of the flow. The method includes: (a) periodically measuring the amount of light detected through a line crossing a suspended droplet; (b) distinguishing between a wet state in which light goes through a suspended droplet and a dry state in which light goes through air only; (c) detecting a period without a change of state that is longer than a predetermined threshold; (d) checking, upon detection of an extended period in a given state, if the state is wet or dry; and (e) declaring a dry state as lack of supply, and a wet state as a blocked stream.

Embodiments of the present invention are described in detail below with reference to the accompanying drawings, which are briefly described as follows:

BRIEF DESCRIPTION OF THE DRAWINGS

The invention is described below in the appended claims, which are read in view of the accompanying description including the following drawings, wherein:

FIG. 1 shows a simplified scheme of an IV monitor of the prior art;

FIG. 3 shows a time chart for an IV monitor of the prior art;

FIG. 4 shows a time chart for an IV monitor of an embodiment of the present invention;

DETAILED DESCRIPTION

Figure 2:
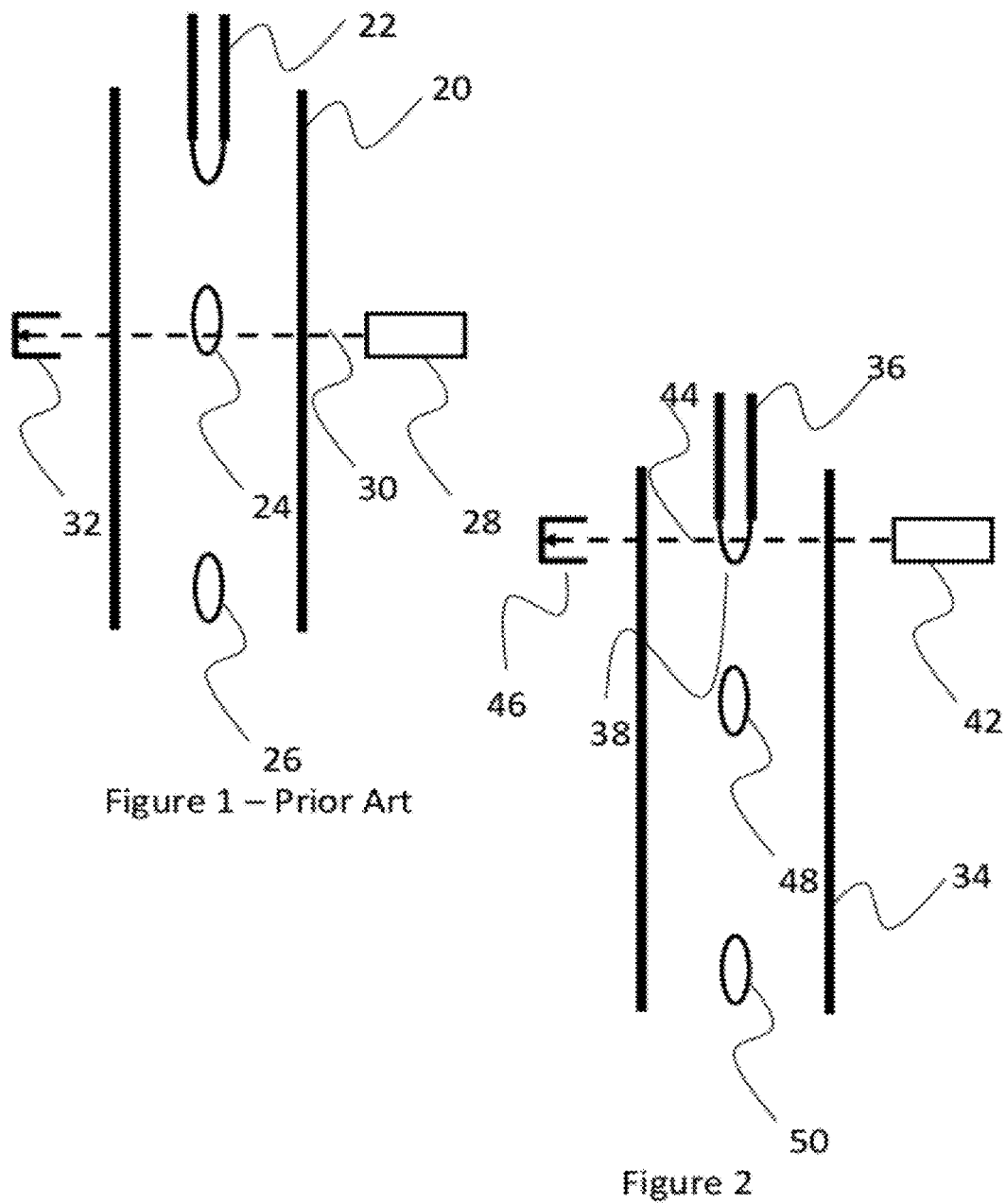
FIG. 2 shows a simplified scheme of an IV monitor of an embodiment of the present invention.

The invention summarized above and defined by the claims below will be better understood by referring to the present detailed description of embodiments of the invention. This description is not intended to limit the scope of claims but instead to provide examples of the invention.

Attention is called to FIG. 1, showing a schematic illustration of a droplet counter device used in the prior art for intravenous (IV) monitor. A light source 28 such as a LED or a laser diode is installed behind the clear wall of the IV compartment 20. The light source 28 directs a light beam 30 toward the path of the droplets 24, 26 that drop from the source tube 22, so that the light beam 30 is crossed by every droplet 24, 26 that falls down. A light detector 32, such as what can be found in the sliding door of many elevators, is installed behind the wall of the compartment along the light path, beyond the droplet path. The amount of light detected by the detector 32 is significantly modulated by the presence of a droplet on the light path. A controller (not shown) monitors the output of the light detector, and produces an alert if the detector signal does not show the modulation for a predetermined time—as this will indicate that droplets are not falling. The reason for not falling may be empty container or blocked flow out of the compartment. In both cases, an alert is due.

Attention is called to FIG. 2, showing a schematic illustration of a droplet counter device per an embodiment of the present invention. A light source 42 such as a LED or a laser diode is installed behind the clear wall of the IV compartment 34 toward the path of the droplets 38, 48, 50 that are formed in the opening of the source tube 36, so that the light beam 44 is crossed by every droplet that is being formed. A light detector 46, such as what can be found in the sliding doors of elevators, is installed behind the wall of the compartment along the light path beyond the droplet emerging area. The amount of light detected by the detector 46 is significantly modulated by the presence of a droplet on the opening of the source tube, and gradually declines as the droplet is growing. At a certain point in time, the weight of the emerging droplet overcomes the surface tension that holds the droplet to the tube 36, and the droplet starts to disconnect from the tube and fall down as a result of gravity. The amount of light in the detector 46 quickly increases and reaches a peak. Shortly after that, a new droplet begins to emerge in the opening of the tube 36 and the amount of light in the detector 46 begins to decrease again.

Attention is now called to FIG. 3, showing a time chart 52 of the intensity of the light detected by the sensor 32 in an IV monitor of the prior art. As explained in FIG. 1, the light in the detector is high, as long as there is no droplet that blocks the path of light, which is most of the time. When a droplet crosses the light path, the output of the detector quickly falls 54 to a low level 55, and as the droplet falls away, the output level quickly increases 56 back to normal. The change in the detector signal can be detected either by quick sampling 58 of the analog output, or by an analog detector that issues an interrupt. In both cases, the electronics of the device has to be active continuously and consumes battery energy at all time. This is a big disadvantage, as the light source is a significant consumer of battery power. Line 59 indicates a threshold. When the signal drops below line 59, the system detects a droplet crossing the sleeve of sight. Note that most of the time the level of light on the sensor is fixed and maximum, and only for brief moments it decreases as the droplet crosses the sleeve of light. Therefore the system has to be "alert" all the time, in order not to miss the brief moment of lower signal. The sampling rate must be high.

Attention is now called to FIG. 4, showing the time chart of operation of the present invention. The level of the light on the sensor is maximum 62 when there is no droplet to block part of the light sleeve. As a new droplet begins to materialize at the tip of the feeding tube, the level of light in the sensor begins to decrease and keeps decreasing as the droplet grows, until the droplet leaves the tube and falls down 66. At this point, the level of light is minimal, and it instantly increases back to the maximum value 68, where it stays for a short while until the new droplet begins to materialize 70. This process continues to the next cycle 72 and on.

If one considers a voltage threshold 76, it is clearly seen that the level of light is less than its maximum value most of the time and is almost always changing. This means that a very low sampling rate 74 is sufficient to detect that the droplets are dropping and to notice the difference between a functioning device and a blocked or dried up device.

The reduction in sampling rate achieved by the present invention means that the light source can be turned off most of the time, and it can be turned on periodically for a sample. This mechanism is well known in the art as "sleep mode"; a device operates with minimal power consumption until it is time to "wake up" and take a new measurement.

Figure 5:
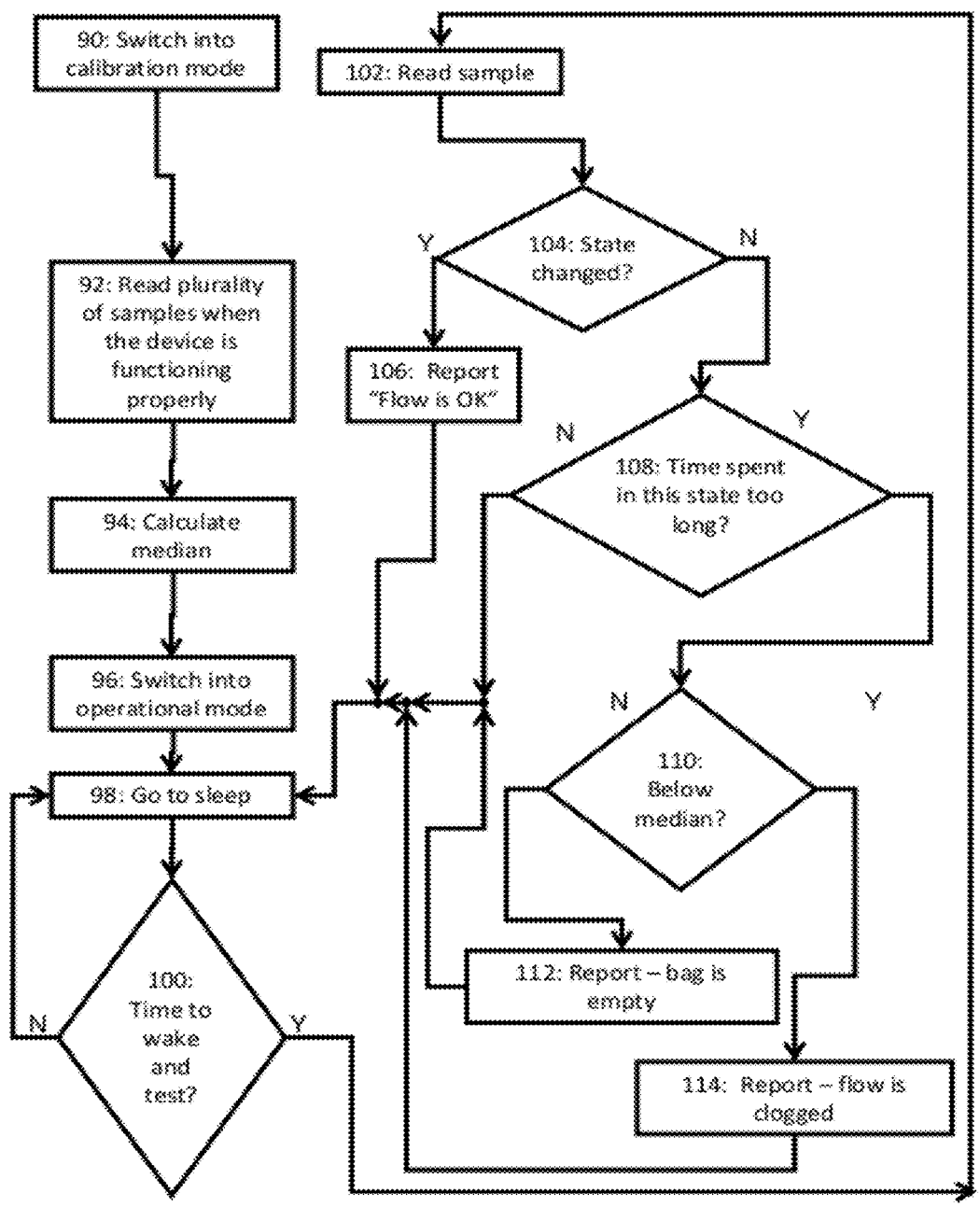
FIG. 5 shows a simplified flow chart of an embodiment of the present invention.

Attention is now called to FIG. 5 showing a flow chart of the operation of the present invention. When power is turned on the system goes 90 into calibration mode and reads the level of light in the area as a reference to set up its dynamic range of the analog circuitry according to the ambient light. The system then turns on a timer. The timer is set initially to a relatively fast rate—typically 0.1 seconds. The system then collects 92 a plurality of samples, and analyzes the statistics of the level of light. The rest of FIG. 5 will be explained after explaining FIG. 6.

Figure 6:
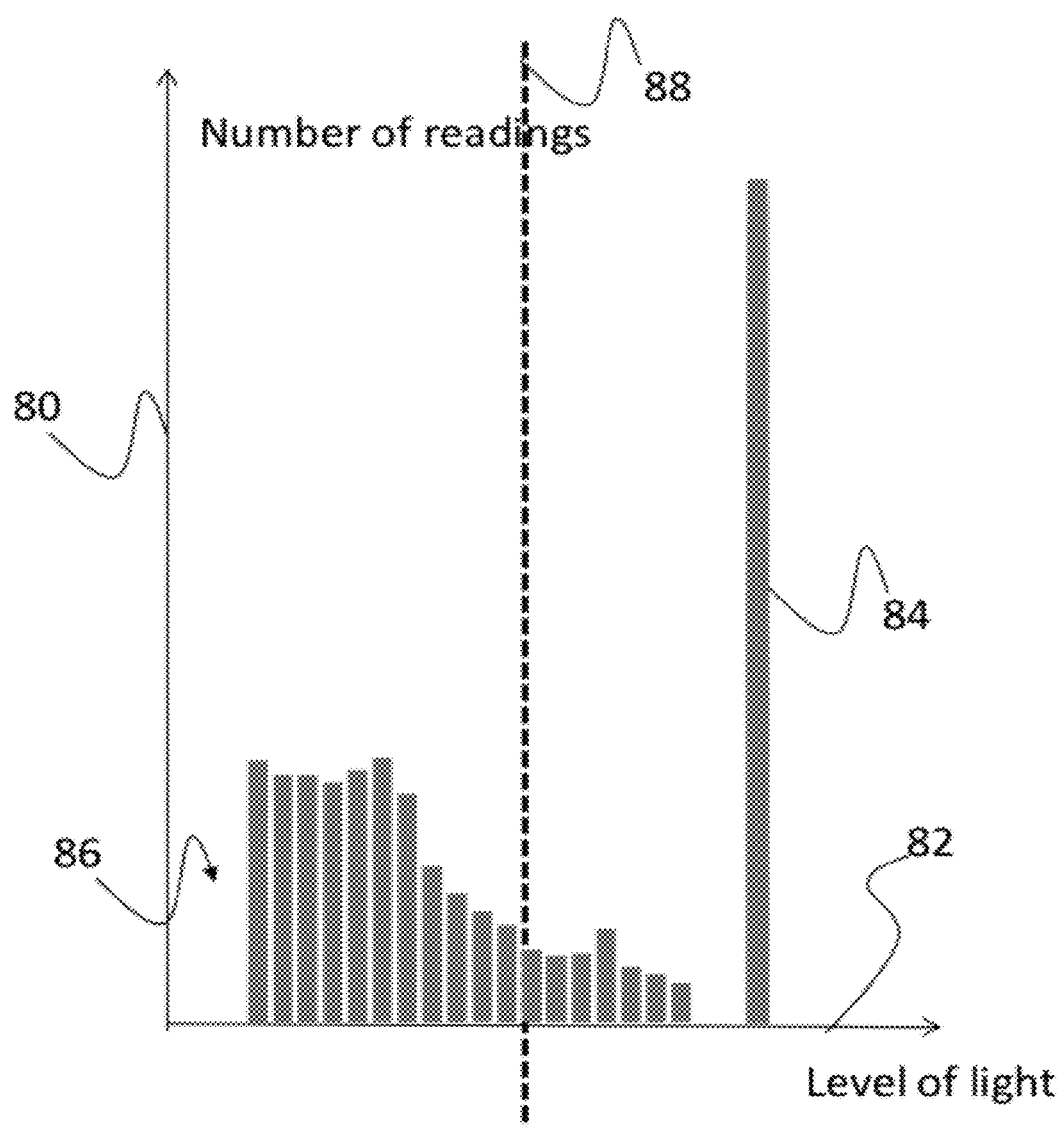
FIG. 6 shows a histogram of levels of light measured in a plurality of samples as described with reference to the flow chart of FIG. 5.

Attention is now called to FIG. 6, showing a histogram of the levels of light measured in a plurality of samples as described in FIG. 5. The horizontal axis is the level of the light on the sensor, spreading from zero on the left to a maximum on the right. The vertical axis is the number of samples in each light level (proper binning is assumed for the histogram).

The cases where there was no droplet to reduce the level of light are all shown at the maximum level of light 84 with the same level, as they are essentially identical. The cases 86 where the there was a droplet to partially block the light on the sensor have a lower level of light than the maximum and a much wider distribution as in some cases the droplet blocks a small part of the light sleeve and in other cases a large part of the light sleeve. Most of the time the droplet blocks a major part of the light sleeve, therefore the lower light level have more instances of occurrence.

A threshold is placed at the approximate median 88 of the level, so statistically 50% of the samples will be higher than the median, and 50% of the samples will be lower than the median. This means that when the device works properly, the probability of "over the median" is about 50%, while when the device is dried up, the probability of "over the median" becomes 100% and when the device is clogged and a droplet remains hanging from the tip of the tube for a long time, the probability of "over the median" becomes 0%. This enables a very simple and reliable way to determine whether the device works properly and, if not, what the nature of the problem is.

Returning now to FIG. 5, once the median is calculated 94 the system is ready to monitor the flow and switches 96 to an operational mode. The system then goes 98 to sleep to save power, turning off the light source, which is the main consumer of power. A timer 100 indicates that it is time to wake up and take a new reading. The system takes 102 a reading, and checks if the level is below or above the median. The system checks if the state has been changed since the last reading. If 104 the state has changed, the system concludes that the dripping is functioning well, as it indicates that a droplet had left the input tube or that a new droplet is being formed. The system then indicates 106 that the flow is OK and goes back to sleep (by default, the "OK" state does not have to be actively reported). The wake-up time is preferably slightly randomized, in order to avoid accidental synch between the drop rate and the wakeup rate. Such synchronization would cause the system to detect the same signal upon each wakeup and wrongly determine that there are no drops.

If the state has not changed since the last reading (the "state" meaning being below or above the median) the system checks 108 if the time in state is too long for normal dripping. If it is not too long, then the system goes to sleep again. If the time in state is too long, then the system determines 110 whether this steady state is below or above median. If it is below median, then it means that a droplet is hanging in the sleeve of light and does not drop. The system then reports 114 that the dripping is clogged. If the system that the steady state of the light level is above the median, then it concludes that no droplet is being formed and reports 112 that the bag is empty.

The sleep-wake-test-report-sleep cycle continues, so that if the dripping resumes, (for example, it the patient using the IV that had been leaning on the pipe had ceased to lean and the flow through the pipe resumed) the alarm can be reset automatically.

Alternatively, the system can sample the light sensor at a higher rate and monitor the state of the droplet in higher resolution, distinguishing between the down going slope of light level (meaning a droplet is being formed) and an up-going slope of light level (meaning a droplet is being detached and falls).

Figure 7:
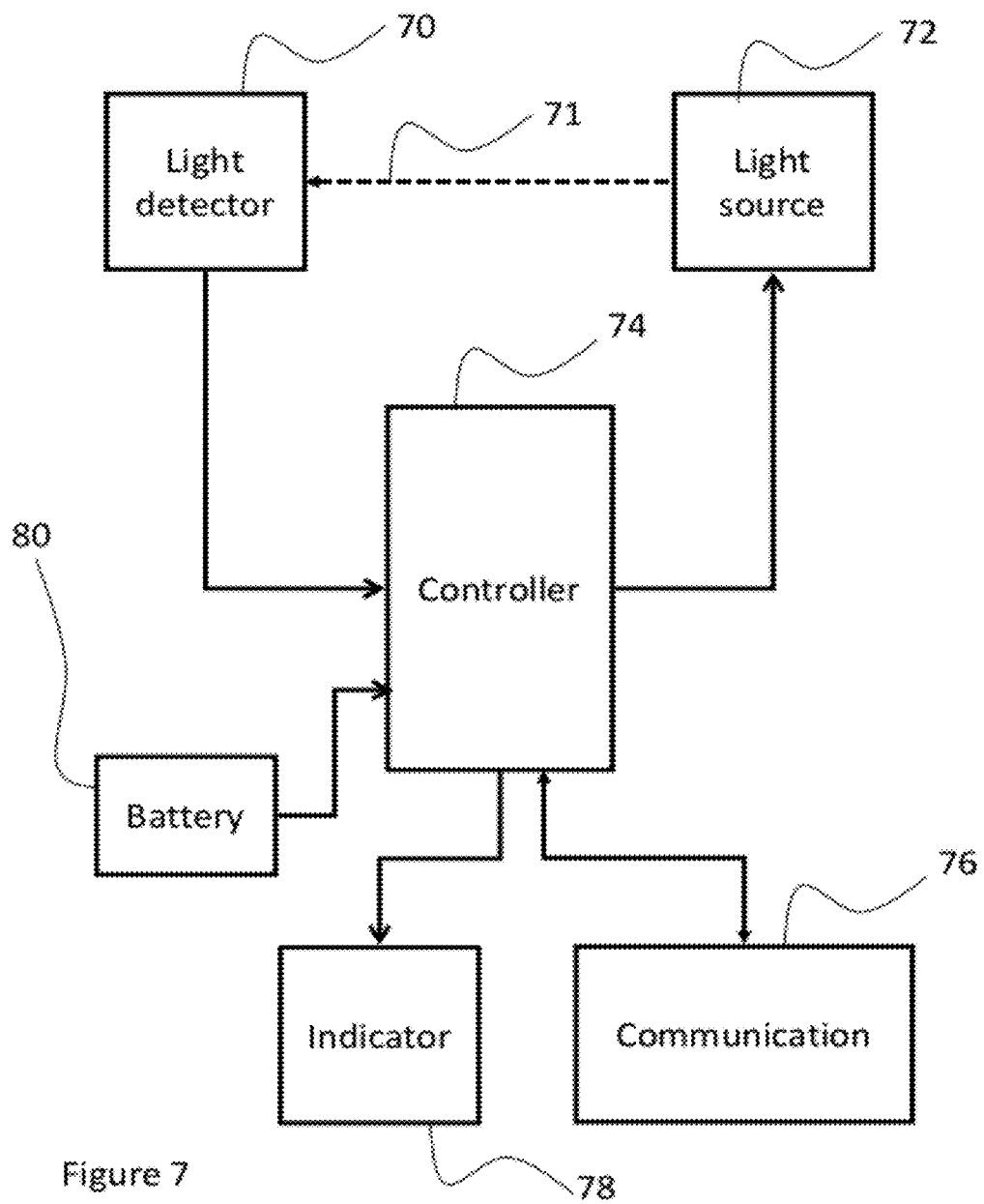
FIG. 7 shows a simplified block diagram of an embodiment of the present invention.

Attention is now called to FIG. 7, showing a simplified block diagram of an embodiment of the present invention. A light source 72, such as a laser diode, is sending a beam of light 71 to a light detector 70. Both light source and light detector are positioned so that the light beam would go through any fluid droplet that is hanging from the input tube (reference number 38 in FIG. 2). A controller 74 switches the light source on and off periodically, so that the light source is turned off most of the time and power is saved. A battery 80 powers the light source 72, the light detector 70, and the controller 74.

When the light source is turned on, the controller measures the level of light from the light detector. The controller runs the process of the functional flow chart of FIG. 5 and issues local alerts via indicator 78 and remote alert messaged via communication port 76.

Having thus described exemplary embodiments of the invention, it will be apparent that various alterations, modifications, and improvements will readily occur to those skilled in the art. Alternations, modifications, and improvements of the disclosed invention, though not expressly described above, are nonetheless intended and implied to be within spirit and scope of the invention. Accordingly, the foregoing discussion is intended to be illustrative only; the invention is limited and defined only by the following claims and equivalents thereto.

We claim:

1. A system for detecting discontinuities in the flow of fluid dripping from a tube, comprising a light source and a light detector configured to monitor the amount of light passing through a droplet while said droplet is suspended on the tip of said tube.

2. A method of monitoring the dripping of fluid from a tube, comprising:
   a. keeping a monitoring system in a low power sleep mode for a predetermined amount of time;
   b. waking the system up from the low power sleep mode to a normal mode and measuring the amount of light detected by a light sensor; and
   c. selecting between sending the system back to sleep and creating an alert, based upon the amount of light detected by said light sensor.

3. A method of discriminating, in a control device monitoring a flow path of a fluid, between two problem states, where one of the states is an up-stream lack of fluid supply and the other state is a down-stream blocking of the flow, said method comprising:
   a. periodically measuring the amount of light detected through a line crossing a suspended droplet;
   b. distinguishing between a wet state in which light goes through a suspended droplet and a dry state in which light goes through air only;
   c. detecting a period without a change of state that is longer than a predetermined threshold;
   d. checking, upon detection of an extended period in a given state, if the state is wet or dry; and
   e. declaring a dry state as lack of supply, and a wet state as a blocked stream.

* * * * *